United States Patent
Salvia, III (10) Patent No.: US 10,589,796 B1
(45) Date of Patent: Mar. 17, 2020

(54) INTEGRATED TAILGATE BED EXTENDER WITH BACK-UP CAMERA

(71) Applicant: Toyota Motor Engineering & Manufacturing North America, Inc., Plano, TX (US)

(72) Inventor: John J. Salvia, III, Ann Arbor, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 0 days.

(21) Appl. No.: 16/119,519

(22) Filed: Aug. 31, 2018

(51) Int. Cl.
  *B60R 11/04* (2006.01)
  *B62D 33/027* (2006.01)
  *B62D 33/037* (2006.01)
  *B60R 1/00* (2006.01)
  *B62D 33/08* (2006.01)

(52) U.S. Cl.
  CPC .......... *B62D 33/0273* (2013.01); *B60R 1/002* (2013.01); *B60R 11/04* (2013.01); *B62D 33/037* (2013.01); *B62D 33/08* (2013.01); *B60R 2300/8066* (2013.01)

(58) Field of Classification Search
  CPC .. B62D 33/0273; B62D 33/037; B62D 33/08; B60R 1/002; B60R 11/04; B60R 2300/8066
  USPC ....................................................... 296/26.1
  See application file for complete search history.

(56) References Cited

U.S. PATENT DOCUMENTS

| | | | |
|---|---|---|---|
| 6,364,392 B1 | 4/2002 | Meinke | |
| 6,932,404 B2 | 8/2005 | Vejnar | |
| 6,983,972 B2 | 1/2006 | Tan et al. | |
| 6,994,363 B2 | 2/2006 | Seksaria et al. | |
| 7,347,473 B2 | 3/2008 | Miller et al. | |
| 7,607,705 B1* | 10/2009 | Mast | B60R 19/483 293/102 |
| 8,830,317 B2* | 9/2014 | Meier | B60Q 1/00 348/143 |
| 9,308,802 B2* | 4/2016 | Warburton | B60J 5/103 |
| 10,070,023 B2* | 9/2018 | Moenig | H04N 5/2252 |
| 2009/0040300 A1* | 2/2009 | Scribner | B60R 1/00 348/143 |
| 2016/0176346 A1* | 6/2016 | Kiehl | B62D 33/027 49/31 |
| 2016/0318456 A1 | 11/2016 | Moenig et al. | |

(Continued)

FOREIGN PATENT DOCUMENTS

KR  101230186 B1  2/2013

*Primary Examiner* — Pinel E Romain
(74) *Attorney, Agent, or Firm* — Christopher J. Darrow; Darrow Mustafa PC (57) ABSTRACT

A removable upper garnish member is provided for a tailgate of a vehicle. The upper garnish member may include a longitudinally extending top portion, an exterior facing side portion, and an interior facing side portion. A camera is positioned within a space defined by the exterior facing side portion. The camera is configured to provide an image depicting a point of view of from a direction behind the vehicle. The removable upper garnish member is configured to be selectively positioned as part of a vehicle tailgate that is movable between one of a closed position, an open position, and a bed extender position. The camera point of view is preferably the same in both the closed and bed extender positions.

20 Claims, 8 Drawing Sheets

(56) References Cited

U.S. PATENT DOCUMENTS

| | | |
|---|---|---|
| 2017/0282979 A1 | 10/2017 | Singer |
| 2017/0361878 A1 | 12/2017 | Loew et al. |
| 2018/0086391 A1 | 3/2018 | Raines et al. |

\* cited by examiner

INTEGRATED TAILGATE BED EXTENDER WITH BACK-UP CAMERA

TECHNICAL FIELD

The present disclosure generally relates to rear view back-up cameras and, more particularly, to an integrated rear view back-up camera operable when a tailgate is located in various positions.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

Rear view back-up cameras are increasingly popular and may be a requirement for future vehicles. In pick-up truck type utility vehicles, particularly having a cargo bed, such cameras have conventionally been designed as part of the handle lift assembly for the tailgate. Many load carrying utility vehicles may be operated or used to transport cargo. In certain instances, the transported cargo is large or oddly shaped, potentially creating a risk for damage to the vehicle during loading or transport, or requiring extra space. Vehicle accessories such as tailgate extenders are becoming increasingly popular for use with various utility vehicles such as pickup trucks. With accessories such as tailgate or bed extenders for pick-up truck type utility vehicles, the vehicles are operated with the tailgate being in an open position. With respect to the operation of the cameras, this becomes a major concern because when the tailgate is in an open position, the handle, and thus the camera, face the ground/road. In this position, the camera is not able to provide images having a point of view from a rear of the vehicle, which is typically the desired point of view.

Accordingly, it would be desirable to provide an improved rear view back-up camera that can serve its intended purpose when it is located in various positions.

SUMMARY

This section provides a general summary of the disclosure, and is not a comprehensive disclosure of its full scope or all of its features.

In various aspects, the present teachings provide a removable upper garnish member for a tailgate of a vehicle. The upper garnish member may include a longitudinally extending top portion, an exterior facing side portion, and an interior facing side portion. A camera is positioned within a space defined by a portion of the upper garnish member, such as the exterior facing side portion. The camera is configured to provide an image depicting a point of view of from a direction behind the vehicle. The removable upper garnish member is configured to be selectively positioned as part of a vehicle tailgate that is movable between one of a closed position, an open position, and a bed extender position. The camera point of view is preferably the same in both the closed and bed extender positions. The upper garnish member may include a communication subassembly connecting the camera to a controller, wherein the communication subassembly is configured to provide communication between the camera and the controller to provide a digital display in the vehicle.

In other aspects, the present teachings provide a vehicle tailgate assembly with an integrated bed extender. The vehicle tailgate assembly includes a tailgate configured to pivotally latch to a cargo bed of a vehicle. The tailgate is selectively operable between a closed position, an open position, and a bed extender position. In various aspects, the tailgate includes an attachment system, a slide system, and a removable upper garnish member. The upper garnish member includes a longitudinally extending top portion, an exterior facing side portion, and an interior facing side portion. A camera is positioned within a space defined by the exterior facing side portion of the upper garnish member. The camera is configured to operate when the tailgate is in both the closed position and the bed extender position, and provides an image depicting a point of view of from a direction behind the vehicle. Preferably, the point of view is the same when the tailgate is in either the closed position or the bed extender position.

In still other aspects, the present teachings are directed to a vehicle. The vehicle can include a passenger compartment, a cargo bed, and a tailgate configured to pivotally latch to the cargo bed and be operable between a closed position, an open position, and a bed extender position. In various aspects, the tailgate includes an attachment system, a slide system, and a removable upper garnish member comprising a longitudinally extending top portion, an exterior facing side portion, and an interior facing side portion. A camera is provided, positioned within a space defined by the exterior facing side portion of the upper garnish member. The camera is configured to operate in both the closed position and the bed extender position and to provide an image depicting a point of view of from a direction behind the vehicle. The vehicle includes a controller configured to receive and provide an image on a display that is positioned within the passenger compartment. In various aspects, the camera point of view is preferably the same in both the closed and bed extender positions.

Further areas of applicability and various methods of enhancing the above technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein.

It should be noted that the figures set forth herein are intended to exemplify the general characteristics of the methods, algorithms, and devices among those of the present technology, for the purpose of the description of certain aspects. These figures may not precisely reflect the characteristics of any given aspect, and are not necessarily intended to define or limit specific embodiments within the scope of this technology. Further, certain aspects may incorporate features from a combination of figures.

DETAILED DESCRIPTION

Figure 1A:
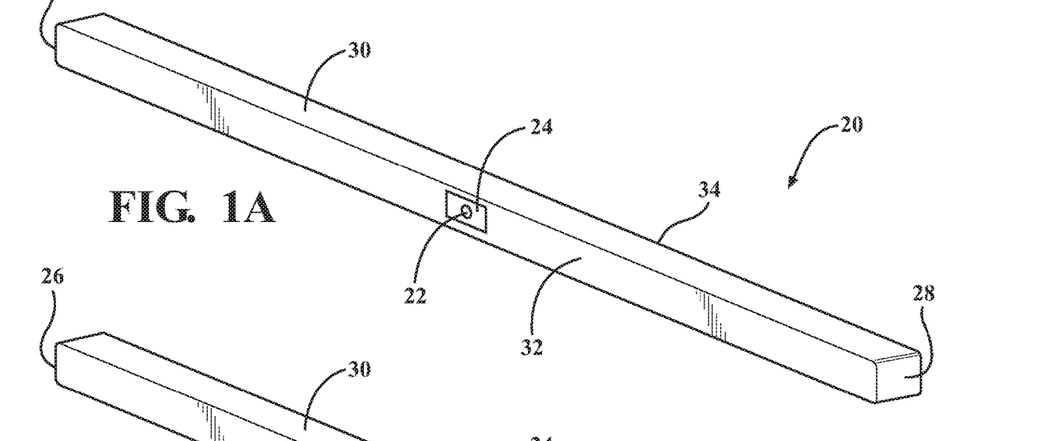
FIG. 1A is a side perspective view of a first exemplary upper garnish member for a vehicle tailgate, and includes a camera located in an exterior facing side portion.
Figures 1B, 3:
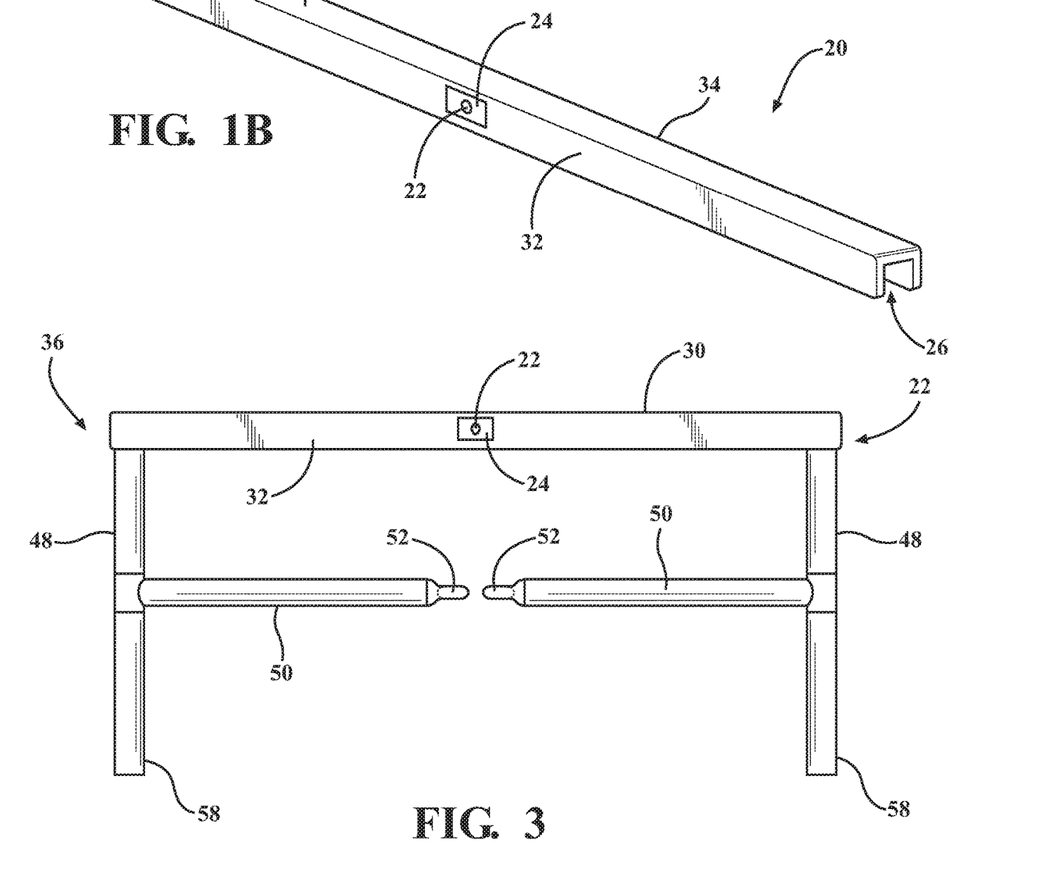
FIG. 1B is a side perspective view of a second exemplary upper garnish member for a vehicle tailgate having open side ends as opposed to the closed side ends of FIG. 1A.
FIG. 3 is a front perspective view of the tailgate bed extender.

The present teachings generally provide a rear view back-up camera located in an upper garnish member of a tailgate of a vehicle. FIG. 1A is a side perspective view of a first exemplary upper garnish member 20 for a vehicle tailgate, and includes an optical camera 22 and optional housing portion 24 adjacent the camera 22. The upper garnish member 20 may be removable with respect to the tailgate. FIG. 1B is a side perspective view of a second exemplary upper garnish member 22 for a vehicle tailgate having open side ends 26 as opposed to the closed side ends 28 of FIG. 1A. As shown, the upper garnish member 20 may include a longitudinally extending top portion 30, an exterior facing side portion 32, and an interior facing side portion 34. The upper garnish member 20 may be shaped such that a cross-section along the length dimension of the upper garnish is substantially U-shaped. A camera 22 is positioned within a space defined by the upper garnish member 20, such as in the exterior facing side portion 32. Thus, the camera 22 is configured to provide an image or video depicting a predetermined point of view of from a direction behind the vehicle.

The removable upper garnish member 20 is configured to be selectively positioned as part of a vehicle tailgate that is movable between one of a closed position, an open position, and a bed extender position. The predetermined point of view of the camera 22 is preferably the same in both the closed and bed extender positions. The upper garnish member 20 may include a communication subassembly, as part of the camera 22, in internal part of the camera housing 24, or the like, connecting the camera 22 to a controller (not specifically shown) that is preferably located within the vehicle. For example, the controller may be in a head unit, as part of navigation system, or part of a computing system of the vehicle, as is known in the art. The communication subassembly is configured to provide communication between the camera 22 and the controller, and to ultimately provide a digital display or otherwise present still or video images to a user in the vehicle. The communication assembly may be at least one of a wired configuration or a wireless configuration. The wired configuration may include connectors that couple to lead wires, or the like, on the tailgate and various portions thereof, allowing for the camera 22 to be electrically connected to the controller. The wireless configuration may include a transmitter capable of communicating with the camera and controller. In various aspects, the transmitter may use at least one of a Bluetooth signal, Wi-Fi communications, and as otherwise known in the art. A receiver may be attached to the controller to receive the data transmitted by the camera and/or transmitter. The controller may ultimately be connected to a display in the passenger cabin to provide a user with a view of behind the vehicle.

The present technology also provides a bed extender 36 configured to be a part of, or separately attached to, a vehicle tailgate 38 that includes the upper garnish member with the rear facing camera. Truck bed extenders 36, or tailgate extenders, are commonly mounted adjacent an end region of a truck bed, or cargo area 40, and may define a perimeter for extending a length dimension of the truck bed or cargo area 40 in order to provide increased storage capacity for bulky items. During use, the tailgate 38 of the vehicle 35 is provided in an open state configuration, which is generally horizontal and level with a bottom surface 43 of the cargo area 40, allowing the tailgate to function as a continuation of the floor portion 43 of the extended cargo area. The bed extender 36 may be attached to the tailgate 38 of the vehicle 35 to provide a user with more cargo space, and the upper garnish member 20 with the camera 22 provides the user with a view behind the vehicle while the bed extender is in use. Still further, as detailed below, the bed extender 36 may be integrated into a cavity 37 defined in the tailgate 38 of the vehicle 35 to provide convenience for users who need more cargo space, while not altering the aesthetic appeal of the vehicle.

While the present technology may be described and presented in the drawings with respect to a pickup truck as an exemplary utility vehicle, it should be understood that the multi-purpose accessory disclosed herein may be used with a variety of differently configured vehicles, for travel either on paved government streets/roads as well as for off-road use.

The camera 22 may include one or more lens and may be a fixed lens or have zoom functions as is known in the art to provide video and/or still images. In various aspects, the camera 22 may be recessed within the upper garnish member 20 so as to minimize any potential damage to the camera 22. In various aspects, the camera 22 may be movable, for example, rotatable in various directions or movable in linear directions. An optional lens cover or removable cover plate can also be provided. As previously indicated, the camera 22 is preferably configured to provide an image or video depicting a predetermined point of view of from a direction behind the vehicle. As used herein, the terms "point of view" or "field of view" are meant to be used interchangeably and may be defined by a horizontal angle of view, for example, as provided at a certain height. Accordingly, it may be desirable that the camera 22 be positioned at the same height, or in other words, have the distance dimension as measured from the camera 22 to the ground/road when used in the different operating configurations of the tailgate assembly, for example, when used in the closed tailgate position, as well as when used in the bed extender position.

FIGS. 2A, 2B, 2C, and 2D illustrate an exemplary vehicle 35 having a cargo bed 40, a passenger compartment 42, and a tailgate assembly 44. The tailgate assembly 44 includes the tailgate 38 with the removable upper garnish member 20 that may be mounted along the top area of the tailgate, coupled to the sides of the tailgate, or otherwise secured thereto. The upper garnish member 20 can include a longitudinally extending top portion 30, an exterior facing side portion 32, and an interior facing side portion 34, with various types of ends 26 (open), 28 (closed), depending on the particular design. It should be understood that the upper garnish member 20 may be provided with different shapes, curvatures, overall lengths and widths, as well as other features and considerations. The upper garnish member 20 may be made of plastic, metal, or a combination of plastic and metal. In various aspects, the upper garnish member 20 may include strategically located reinforcements for added strength as desired. Being removable and containing a camera 22 and potentially other electronics, a suitable locking mechanism (not shown) may be provided to secure the upper garnish member 20 to the tailgate 38. In certain aspects, the locking mechanism may be coupled or coordinated with a locking feature the handle 46, or be configured with a local or remotely actuated locking feature.

Figure 2A:
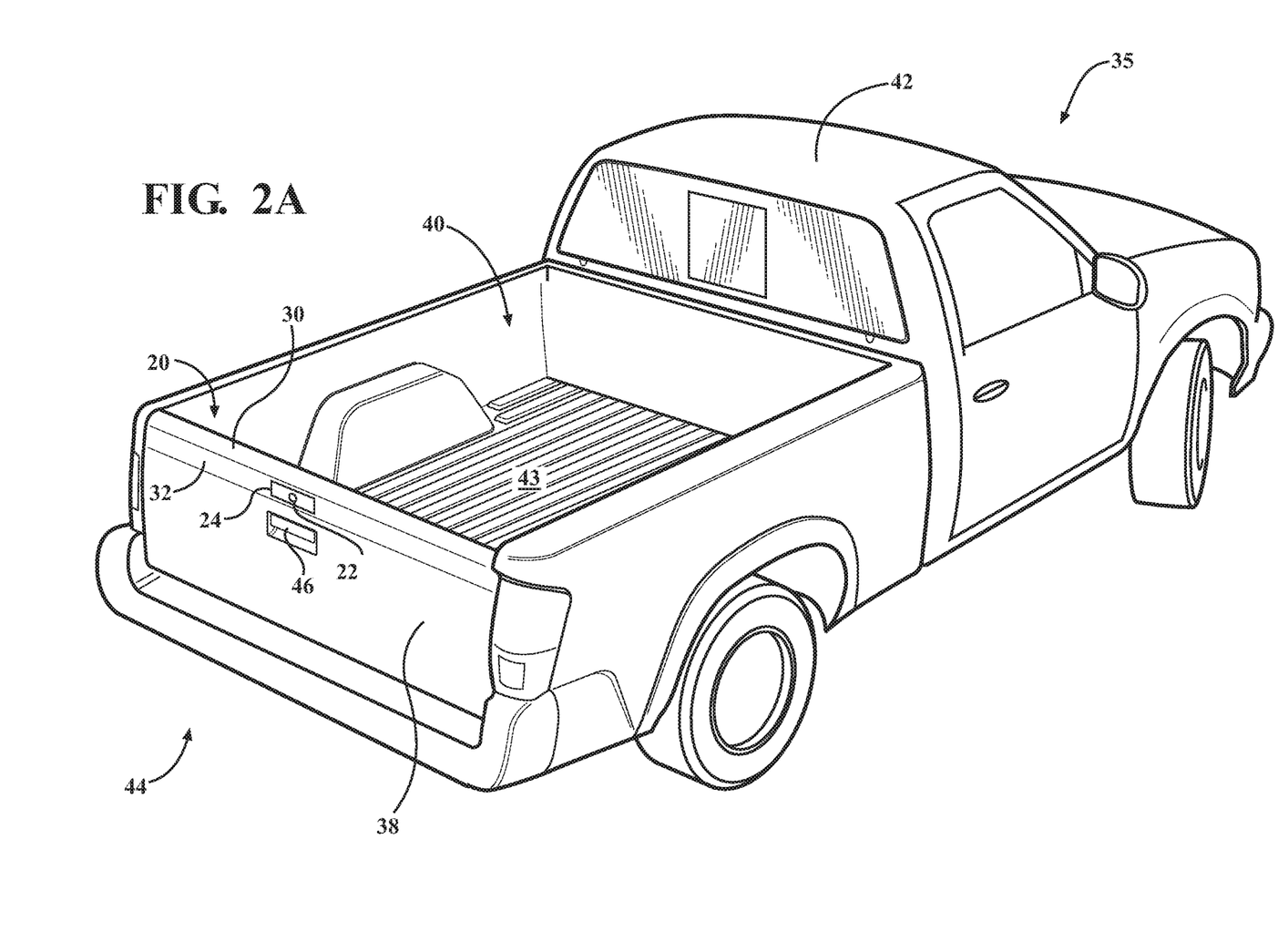
FIG. 2A is a side perspective view of a pick-up type utility vehicle with a tailgate in a closed position and including the upper garnish member of the present technology.
Figure 2B:
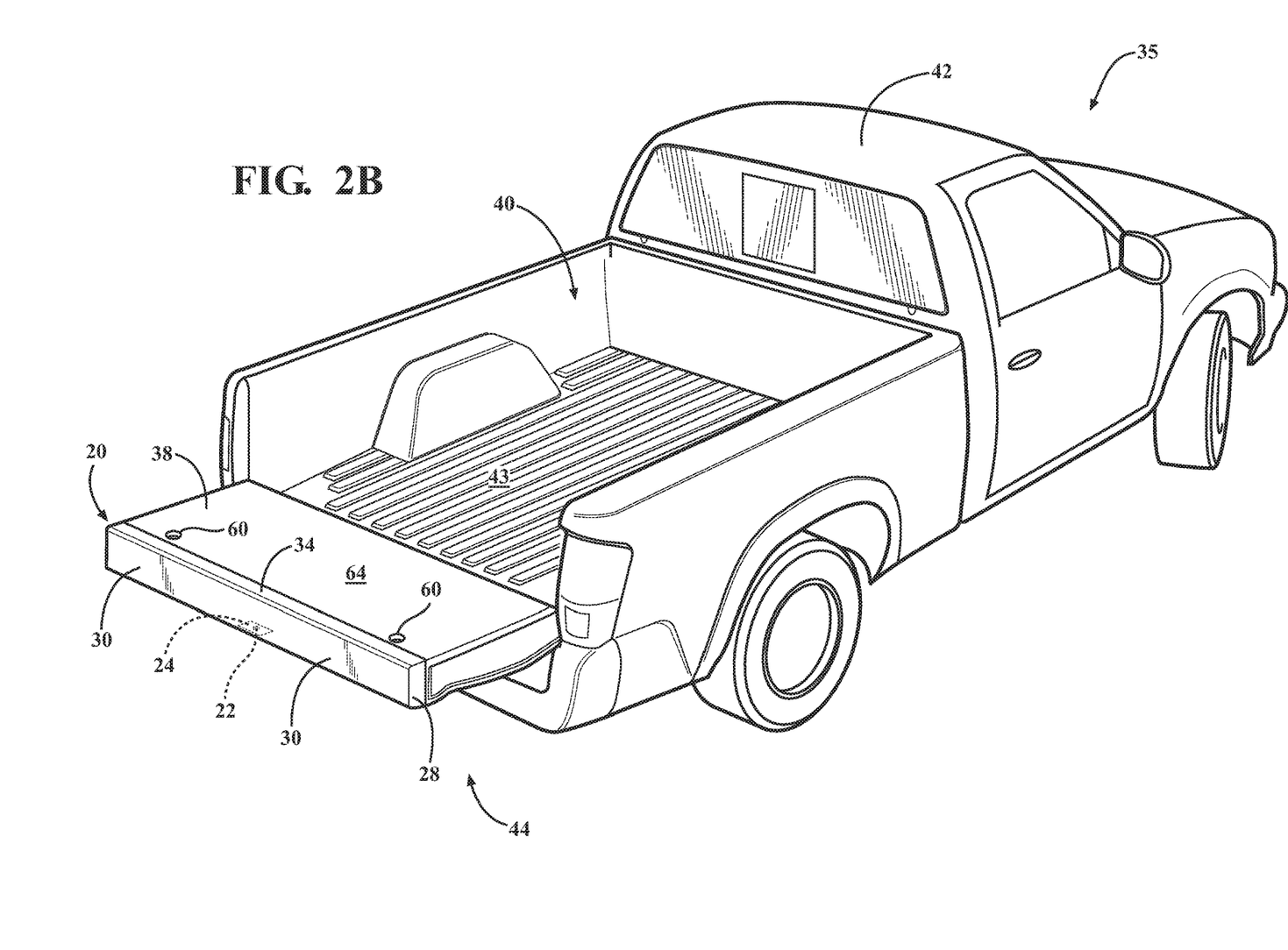
FIG. 2B is a side perspective view of the pick-up type utility vehicle of FIG. 2A illustrated with the tailgate in an open position.

FIG. 2A shows the tailgate 38 in the closed position, where the upper garnish member 20 is located on the top tailgate 38 and the bed extender 36 is stored/located within a cavity 37 as will be described below. FIG. 2B is a side perspective view of the pick-up type utility vehicle 35 of FIG. 2A illustrated with the tailgate 38 in an open position with the upper garnish member 20 attached. As can be seen, when the tailgate is in the open position of FIG. 2B, the camera is generally facing in a downward direction, thus is not capable of providing images or video with a point of view of a direction behind the vehicle 35. In various aspects, an additional camera may be provided in the longitudinally extending top portion of the upper garnish member 20.

Figure 2C:
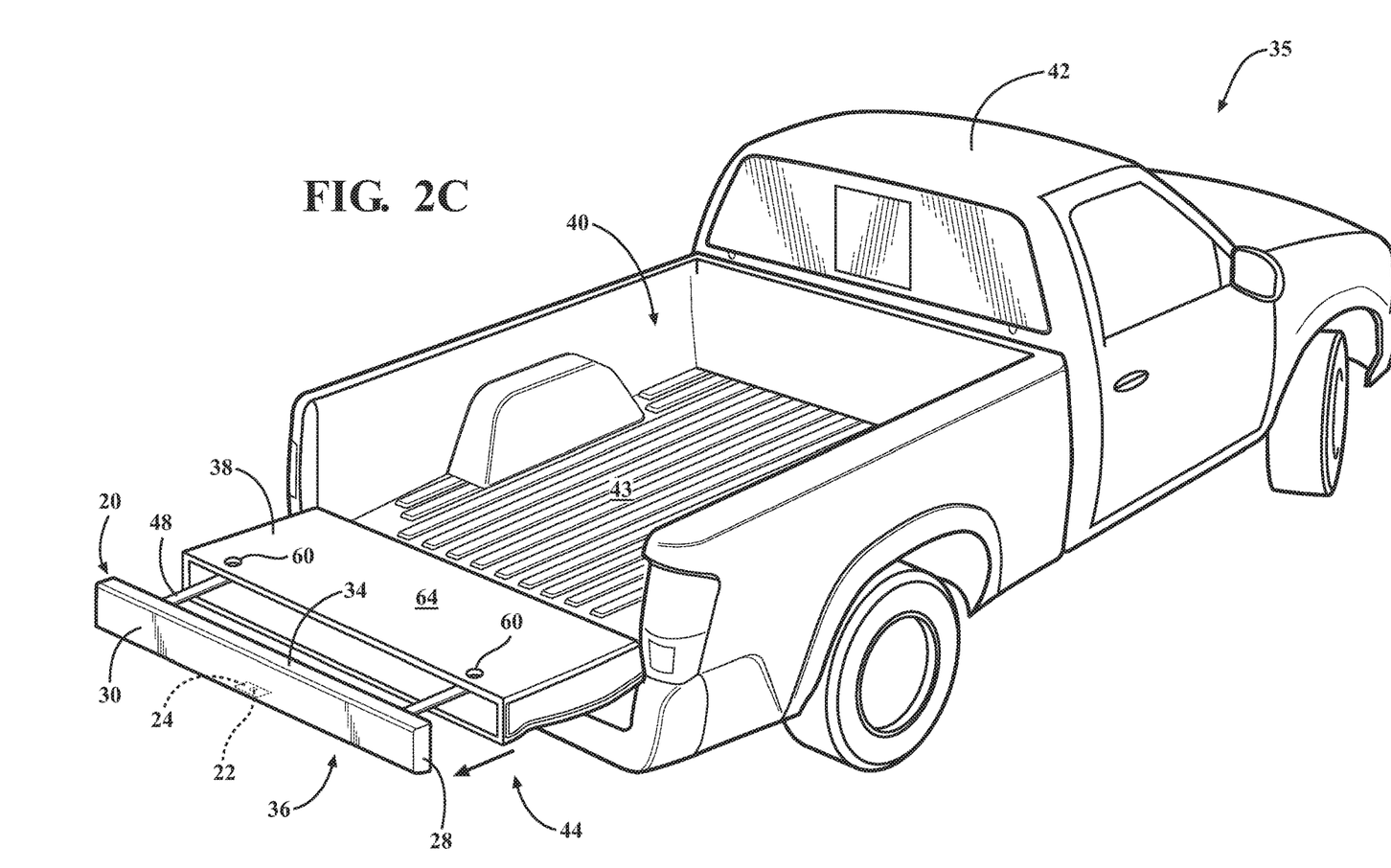
FIG. 2C is a side perspective view of the pick-up type utility vehicle of FIG. 2A illustrated with the tailgate in an intermediate position, showing movement of components of the tailgate from the open position to a bed extender position.
Figure 2D:
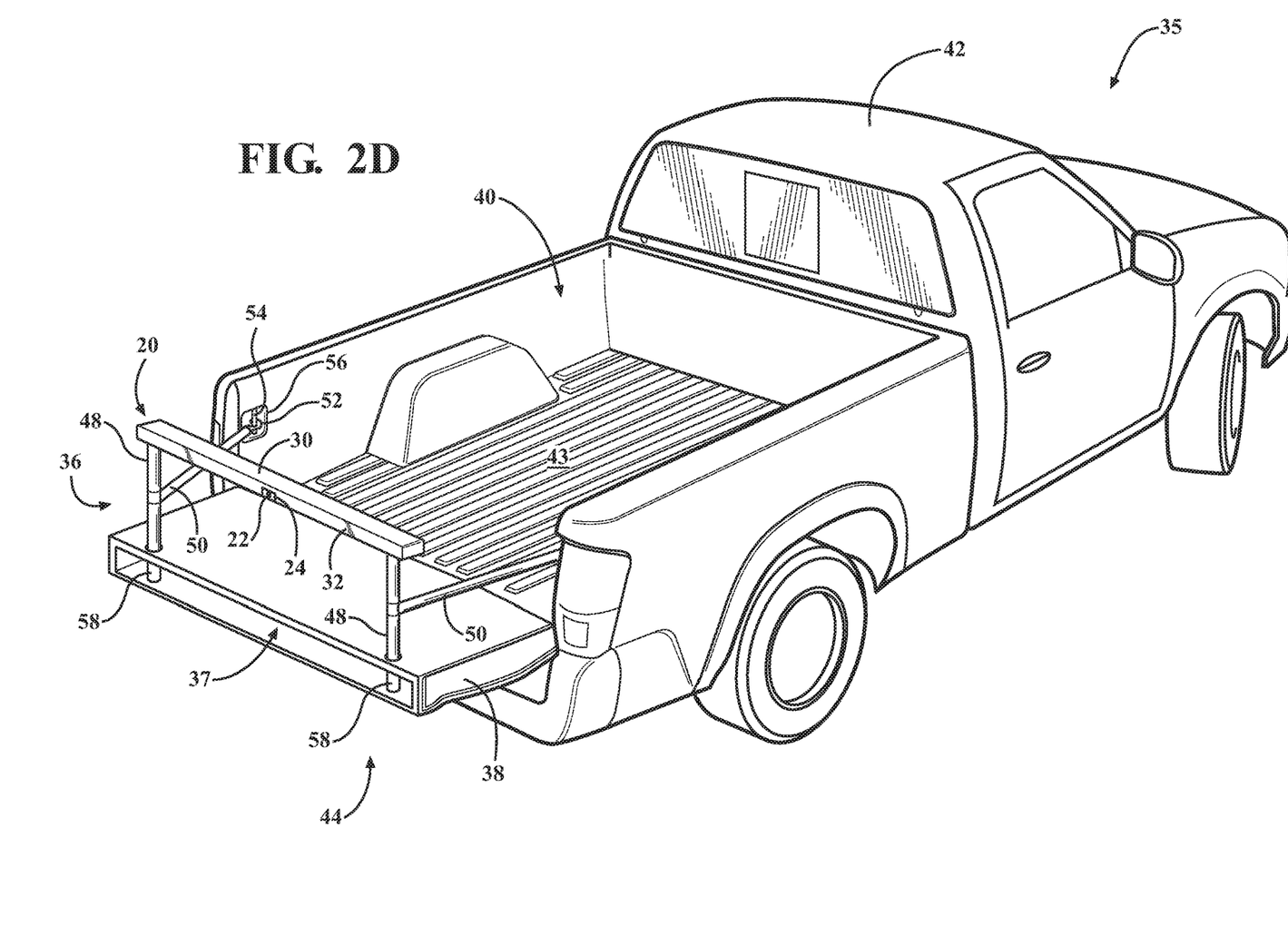
FIG. 2D is a side perspective view of the pick-up type utility vehicle of FIG. 2A illustrated with the tailgate in the bed extender position and the upper garnish member provided at a height substantially the same as a height provided in FIG. 2A.

FIG. 2C is a side perspective view of the pick-up type utility vehicle of FIG. 2A illustrated with the tailgate assembly in an intermediate position, showing movement of components of the tailgate from the open position to a bed extender position. FIG. 2D is a side perspective view of the pick-up type utility vehicle of FIG. 2A illustrated with the tailgate 38 in the open position with the bed extender 36 coupled to the tailgate 38 and the upper garnish member 20 provided at a height substantially the same as a height provided in FIG. 2A.

FIG. 3 illustrates one exemplary bed extender 36, similar to that provided in FIG. 2D that includes an upper garnish member 20 coupled to a pair of support brackets 48, with a pair of support arms 50 that may be rotatably coupled to the support brackets 48. The rotatable coupling allows for the support arms 50 to selectively extend a distance into the cargo bed 40 of the vehicle 35. The support arms 50 are generally linear rods that may have a coupling mechanism 52 located at an end of each support arm 50 that, when the support arms 50 are extended into the cargo bed 40, contact a latch receiver 54. As shown, the coupling mechanism 52 may any suitable type of a hook/latch that connects and secures with a latch receiver 54 such that the support arms 50 are maintained in the extended position. The exemplary latch receiver 54 shown in FIG. 2D is a cylindrical shaped rod disposed within a cavity 56 defined in the cargo bed 40. In the non-limiting example, the bottom ends 58 of the support brackets 48 are located in coordinating apertures 60 defined in the tailgate 38.

Figure 4:
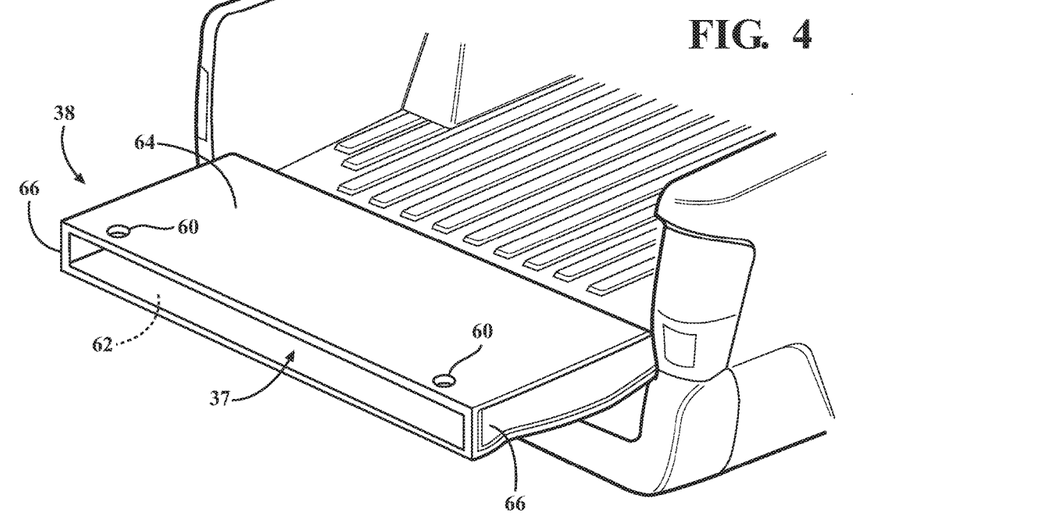
FIG. 4 is a partial perspective view of FIG. 2C, illustrating the tailgate defining a cavity for housing the tailgate bed extender.

FIG. 4 is a partial perspective view of FIG. 2C, illustrating the tailgate 38 defining a cavity for housing the tailgate bed extender 36. FIG. 4 shows the tailgate 38 in the open position with the upper garnish member 20 completely removed from the tailgate. In the orientation as provided in FIG. 4, the tailgate 38 includes a lower face 62, an upper face 64, and opposing side faces 66 defining a cavity 37 within the tailgate 38. The cavity 37 allows for the support brackets 48 and support brackets 50 of the bed extender 36 to be stored inside the tailgate 38, generally with the upper garnish member 20 remaining outside of the tailgate 38 and particularly defining the top of the tailgate 38.

Figure 5A:
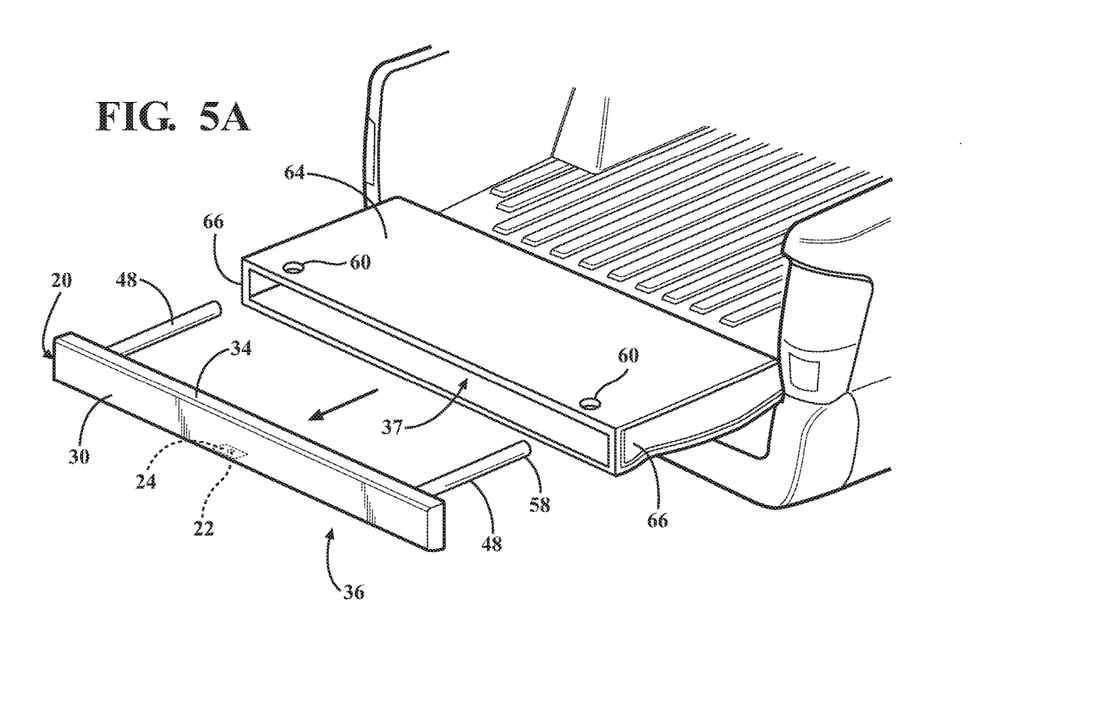
FIGS. 5A-5B are partial perspective views illustrating the use of a first exemplary bed extender with the upper garnish member of the present technology.
Figure 5B:
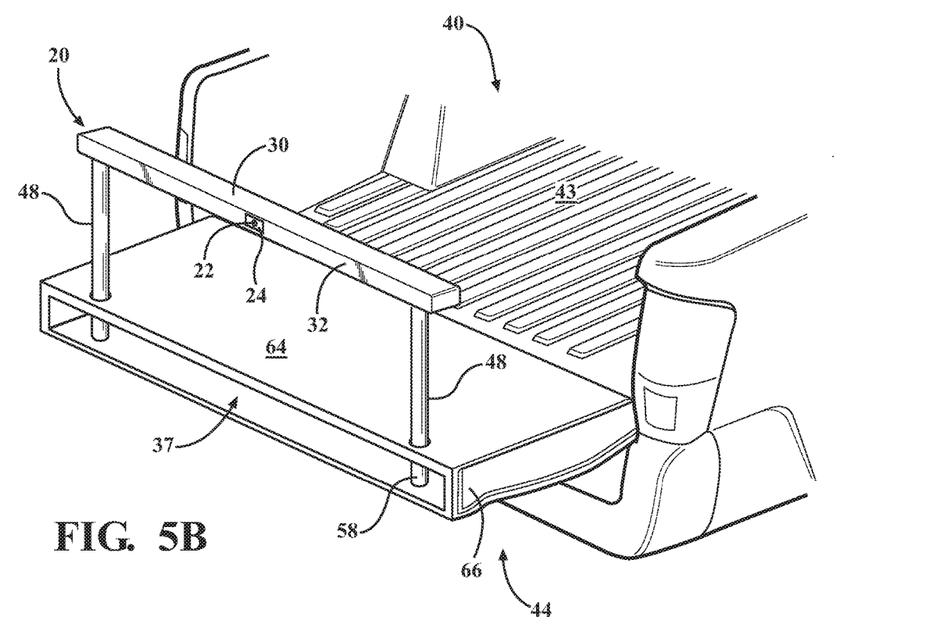

Thus, in various aspects, the bed extender 36 may be configured such that the support brackets 48 and optional support arms 50 are removable from the tailgate 38 and may be removably coupled to a fitting or aperture 60 on the exterior of the tailgate 38, shown on the upper face 64. FIGS. 5A and 5B illustrate a removable bed extender 36, with FIG. 5A illustrating the removal of the bed extender 36 and FIG. 5B showing the mounting of the bed extender 36 in the aperture fittings 60. For simplicity of the illustrations, FIG. 5B does not shown the optional support arms 50 otherwise provided in FIG. 2D and FIG. 3.

Figure 6A:
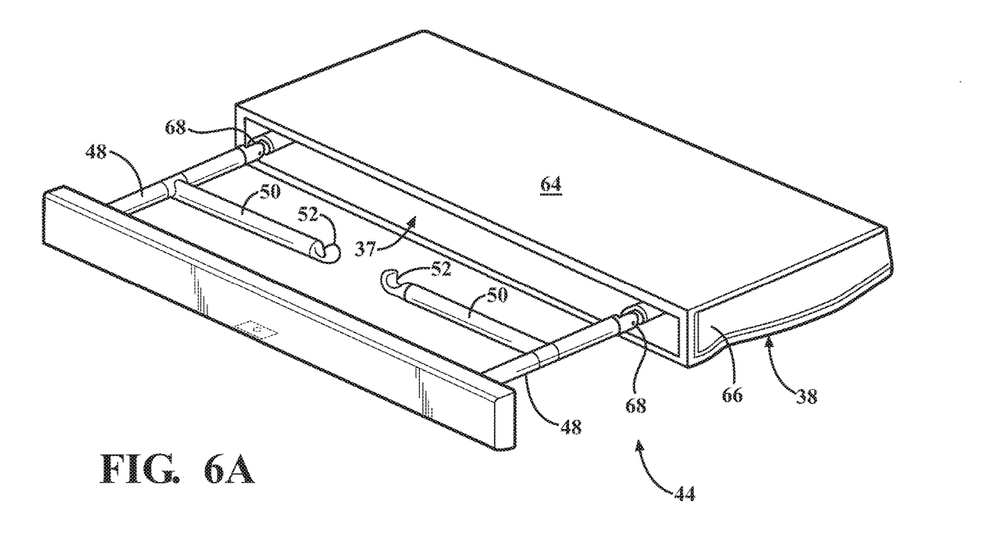
FIGS. 6A-6B are partial perspective views illustrating the use of a second exemplary bed extender with the upper garnish member of the present technology.
Figure 6B:
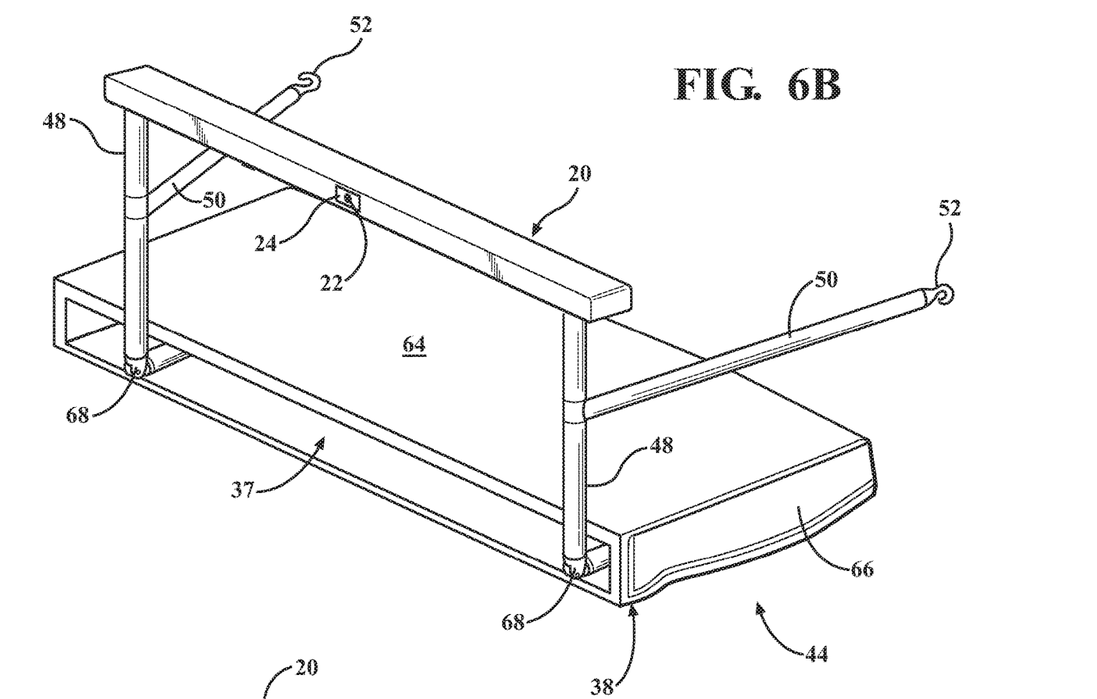

It should be understood that FIGS. 5A and 5B merely show one exemplary bed extender 36 design. Another non-limiting example includes the bed extender 36 being rotatably coupled to the tailgate 38 by a bending joint 68 that may be disposed on the end 58 of the support brackets 48. FIGS. 6A and 6B illustrate the joint coupling, which allows for the bed extender 36 to be pulled out of the cavity 37 of the tailgate 38 and then rotated into its extended position.

Figure 7:
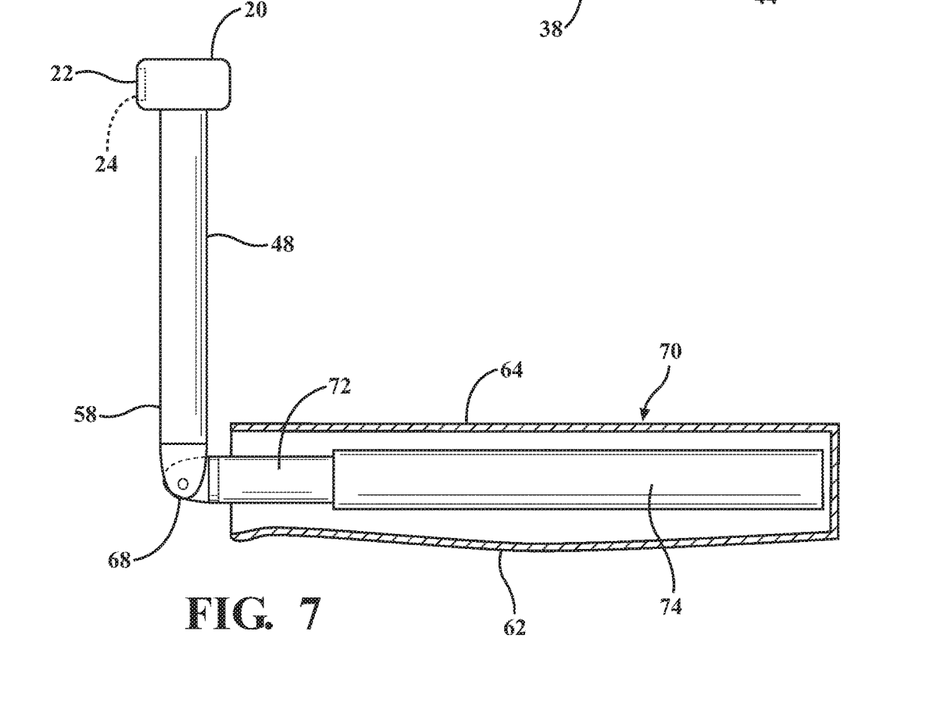
FIG. 7 is a side plan view of the bed extender of FIG. 6B showing additional details of a folding mechanism.

FIG. 7 is a side plan view of the bed extender of FIG. 6B, showing additional details of a folding mechanism. FIG. 7 specifically illustrates an example of a slide system that rests in the cavity 37 of the tailgate 38. As shown, the slide system may include a slide member 72 and a slide mount 74, where the slide member 72 may be coupled to the bed extender 36 at the joint 68 and the slide mount 74 may be coupled to the inside of the tailgate 38. The slide system allows for coordinated movement of the bed extender 36 into and out of the tailgate. It should be understood that different mounting configurations may require different slide configurations, with non-limiting examples such as an open-ended slide for the removable bed extender of FIGS. 5A and 5B to allow for the bed extender 36 to be fully removed from the tailgate 38, and a closed-ended slide to constrain the bed extender 36 for configurations similar to FIGS. 6A and 6B where the bed extender 36 rotates into position.

The foregoing description is provided for purposes of illustration and description and is in no way intended to limit the disclosure, its application, or uses. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range, including the endpoints.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

What is claimed is:

1. A removable upper garnish member for a tailgate of a vehicle, the upper garnish member comprising:
   a longitudinally extending top portion, an exterior facing side portion, and an interior facing side portion; and
   a camera positioned within a space defined by the upper garnish member, the camera being configured to provide an image depicting a point of view of from a direction behind the vehicle.

2. The removable upper garnish member according to claim 1, wherein the upper garnish member is configured to be selectively positioned as part of a vehicle tailgate that is movable between one of a closed position, an open position, and a bed extender position.

3. The removable upper garnish member according to claim 1, further comprising:
   a communication subassembly connecting the camera to a controller, wherein the communication subassembly is configured to provide communication between the camera and the controller to provide a digital display in the vehicle.

4. The removable upper garnish member according to claim 3, wherein the communication subassembly comprises at least one connector that coordinates with the tailgate and provides communication between the camera and the controller.

5. The removable upper garnish member according to claim 3, wherein the communication subassembly comprises a transmitter that provides a wireless communication between the camera and the controller.

6. The removable upper garnish member according to claim 1, wherein the upper garnish member is secured to the tailgate with attachment points located along a top of the tailgate.

7. The removable upper garnish member according to claim 1, wherein the camera is secured by a space defined in the exterior facing side portion.

8. The removable upper garnish member according to claim 1, wherein a cross section of the upper garnish member along a length dimension is substantially U-shaped.

9. A vehicle tailgate assembly with an integrated bed extender, the vehicle tailgate assembly comprising:
   a tailgate configured to pivotally latch to a cargo bed of a vehicle and be operable between a closed position, an open position, and a bed extender position, the tailgate comprising:
   an attachment system;
   a slide system;
   a removable upper garnish member comprising a longitudinally extending top portion, an exterior facing side portion, and an interior facing side portion; and
   a camera positioned within a space defined by the exterior facing side portion of the upper garnish member, the camera being configured to operate in both the closed position and the bed extender position and to provide an image depicting a point of view of from a direction behind the vehicle.

10. The vehicle tailgate assembly according to claim 9, wherein the attachment system comprises:
   a pair of support brackets configured to be coupled to the upper garnish member; and
   a pair of support arms, each support arm movably coupled to a respective support bracket to rotate in a horizontal direction between a first position disposed between the support brackets and a second position extending into a vehicle cargo bed.

11. The vehicle tailgate assembly according to claim 10, wherein the pair of support arms comprises:
   a pair of linear rods disposed in a horizontal direction, wherein each linear rod is rotatably coupled to each respective support bracket to provide coordinated movement between the first position and the second position; and
   a pair of coupling mechanisms on the linear rods that couple with a pair of receivers when the support arms are in the second position.

12. The vehicle tailgate assembly according to claim 9, wherein the tailgate comprises a lower face, an upper face, and opposing side faces that cooperate to define a cavity within the tailgate for housing the slide system.

13. The vehicle tailgate assembly according to claim 12, wherein the slide system comprises:
   a slide mount disposed within the cavity and coupled to the opposing side faces of the vehicle tailgate; and
   a slide member coupled to the slide mount, wherein the slide member is movably coupled to support brackets configured to be coupled to the upper garnish member.

14. The vehicle tailgate assembly according to claim 13, wherein the slide system further comprises:
   a pair of joints disposed between the support brackets and the slide member, wherein the joints rotate between a horizontal first position and a vertical second position.

15. A vehicle, comprising:
   a passenger compartment;
   a cargo bed;

a tailgate configured to pivotally latch to the cargo bed and be operable between a closed position, an open position, and a bed extender position, the tailgate comprising:
- an attachment system;
- a slide system;
- a removable upper garnish member comprising a longitudinally extending top portion, an exterior facing side portion, and an interior facing side portion; and
- a camera positioned within a space defined by the exterior facing side portion of the upper garnish member, the camera being configured to operate in both the closed position and the bed extender position and to provide an image depicting a point of view of from a direction behind the vehicle; and a controller configured to receive and provide an image on a display that is positioned within the passenger compartment.

16. The vehicle according to claim 15, wherein the attachment system comprises:
- a pair of support brackets coupled to the upper garnish member; and
- a pair of support arms, each support arm movably coupled to respective support brackets to rotate in a horizontal direction between a first position disposed between the support brackets and a second position extending into the cargo bed.

17. The vehicle according to claim 16, wherein the pair of support arms comprise:
- a pair of linear rods disposed in a horizontal direction, wherein the linear rods are rotatably coupled to each respective support bracket to provide coordinated movement between the first position and the second position; and
- a pair of coupling mechanisms on the linear rods that couple with a pair of receivers when the support arms are in the second position.

18. The vehicle according to claim 15, wherein the tailgate comprises a lower face, an upper face, and opposing side faces that cooperate to define a cavity within the tailgate for housing the slide system.

19. The vehicle according to claim 18, wherein the slide system comprises:
- a slide mount disposed within the cavity and coupled to the opposing side faces of the vehicle tailgate; and
- a slide member coupled to the slide mount, wherein the slide member is movably coupled to support brackets configured to be coupled to the upper garnish member.

20. The vehicle according to claim 15, wherein the upper garnish member comprises a communication subassembly connecting the camera to the controller.

* * * * *